W. A. BARTZ.
VALVE.
APPLICATION FILED JUNE 29, 1915.

1,182,737.

Patented May 9, 1916.

WITNESSES

INVENTOR
William A. Bartz.
BY
ATTORNEYS

UNITED STATES PATENT OFFICE.

WILLIAM A. BARTZ, OF SCHENECTADY, NEW YORK.

VALVE.

1,182,737.

Specification of Letters Patent.

Patented May 9, 1916.

Application filed June 29, 1915. Serial No. 36,971.

*To all whom it may concern:*

Be it known that I, WILLIAM A. BARTZ, a citizen of the United States, and a resident of Schenectady, in the county of Schenectady and State of New York, have invented a new and Improved Valve, of which the following is a full, clear, and exact description.

The object of the invention is to provide a new and improved valve arranged to provide an effective closing of the valve, an easy opening of the same and convenient replacing of the packing while the valve is closed.

In order to accomplish the desired result, use is made of a valve casing having an inlet and an outlet, valves arranged within the said casing and adapted to open and close the said inlet and outlet, a valve spindle mounted to turn in the casing and having threads, a nut screwing on the said screw threads, and links pivotally connecting the said nut with the said valves.

A practical embodiment of the invention is represented in the accompanying drawings forming a part of this specification, in which similar characters of reference indicate corresponding parts in both views.

Figure 1:
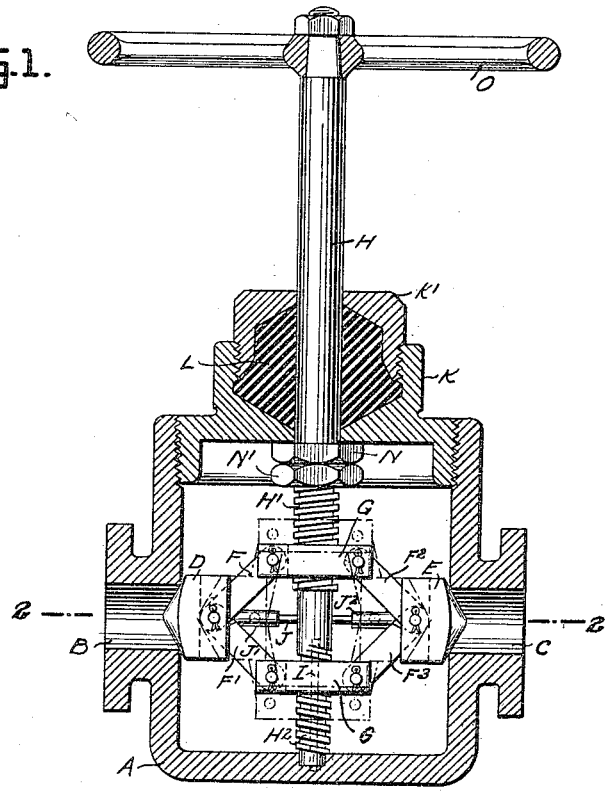
Figure 2:
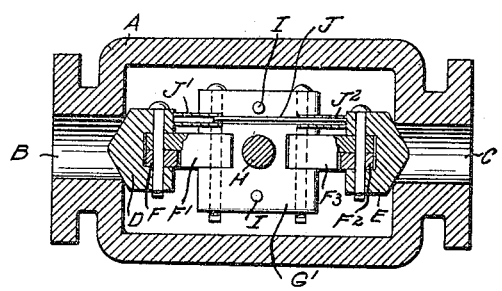

Figure 1 is a sectional side elevation of the valve; and Fig. 2 is a sectional plan view of the same on the line 2—2 of Fig. 1.

The valve casing A is provided at its opposite sides with an inlet B and an outlet C, and the said inlet B and the said outlet C are adapted to be closed and opened by valves D and E arranged within the casing A. The valve D is connected by top and bottom links F and F' with nuts G and G', and similar links F² and F³ connect the valve E with the said nuts G, G'. The nuts G and G' screw on right and left-hand threads H' and H² of a valve spindle H mounted to turn at its lower end in the bottom of the valve casing A, as plainly indicated in Fig. 1. When the valve spindle H is turned in one direction the nuts G and G' move apart and in doing so the corresponding links F, F' and F², F³ pull the valves D and E inward toward each other and out of engagement with the inlet B and the outlet C to open the same. When the valve spindle H is turned in the reverse direction then the nuts G and G' screw toward each other and in doing so the links F, F' and F², F³ move the valves D and E outward into engagement with the inlet B and the outlet C to close the same.

In order to prevent the nut G' from turning, use is made of pins I held in the bottom of the valve casing A and slidingly engaging the nut G on opposite sides of the screw thread H². In order to prevent the valves D and E from moving out of alinement use is made of a pin J slidingly engaging tubes J' and J² secured on the opposite faces of the valves D and E so that when the valves move toward or from each other a guiding connection is had by the pin J slidingly engaging the tubes J' and J².

The valve casing A is provided at the top with a stuffing box K containing a packing L engaged at the top by a gland K' screwing in the stuffing box K. A nut N screws on the upper end of the screw thread H' and extends close to the under side of the stuffing box K to hold the spindle H against upward movement. The nut N is locked in place by a lock nut N'. A hand wheel O is secured to the upper end of the spindle H to permit the operator to conveniently turn the spindle for moving the valves D and E into open or closed position as above described.

It will be noticed that by the arrangement described, the valve is properly packed without danger of leakage at the spindle and whenever it is desired to replace the packing L at the time the valves D and E are closed, it is only necessary to unscrew the gland K' from the stuffing box K and replace the packing therein, and then return the gland to the stuffing box. It will also be noticed that the stuffing box K can be removed from the casing A without disturbing the valves.

Having thus described my invention, I claim as new and desire to secure by Letters Patent:

1. A valve, comprising a valve casing having an inlet and an outlet, valves within the said casing and adapted to open and close the said inlet and the said outlet, a valve spindle mounted to turn in the said valve casing and having a right-hand and a left-hand screw thread, nuts screwing on the said right and left-hand screw threads, links connecting the said nuts with the said valves, and a guiding pin parallel to the valve spindle held in the said casing, the said guiding pin having a sliding connection with one of the said nuts.

2. A valve, comprising a valve casing having an inlet and an outlet, valves within the said casing and adapted to open and close the said inlet and the said outlet, a valve spindle mounted to turn in the said valve casing and having a right-hand and a left-hand screw thread, nuts screwing on the said right and left hand screw threads, links connecting the said nuts with the said valves, tubes projecting from the opposing faces of the valves and a rigid pin sliding in said tubes.

3. A valve comprising a valve casing having oppositely arranged inlet and outlet valves in the casing for opening and closing the inlet and outlet, a valve spindle mounted to turn in the casing and having right and left hand screw threads, nuts screwing on the said screw threads, links connecting the nuts with the valves, means for preventing one nut from turning, and means for holding the valves in alinement.

In testimony whereof I have signed my name to this specification in the presence of subscribing witnesses.

WILLIAM A. BARTZ.

Witnesses:
HERMANN KOSTER,
FRED W. KANZELMYER.

Copies of this patent may be obtained for five cents each, by addressing the "Commissioner of Patents, Washington, D. C."